(12) United States Patent
Westman et al.

(10) Patent No.: US 9,210,120 B2
(45) Date of Patent: *Dec. 8, 2015

(54) COMMUNICATION SYSTEM AND METHOD FOR ESTABLISHING A CONNECTION TO A SERVING NETWORK ELEMENT

(75) Inventors: Ilkka Westman, Helsinki (FI); Markku Tuohino, Espoo (FI)

(73) Assignee: Nokia Technologies Oy, Espoo (FI)

( * ) Notice: Subject to any disclaimer, the term of this patent is extended or adjusted under 35 U.S.C. 154(b) by 585 days.

This patent is subject to a terminal disclaimer.

(21) Appl. No.: 12/073,640

(22) Filed: Mar. 7, 2008

(65) Prior Publication Data
US 2008/0159194 A1 Jul. 3, 2008

Related U.S. Application Data

(62) Division of application No. 10/433,502, filed as application No. PCT/EP00/12171 on Dec. 4, 2000, now Pat. No. 7,392,034.

(51) Int. Cl.
| | |
|---|---|
| H04W 88/18 | (2009.01) |
| H04L 29/08 | (2006.01) |
| H04L 29/12 | (2006.01) |
| H04L 12/54 | (2013.01) |
| H04W 80/10 | (2009.01) |
| H04L 29/06 | (2006.01) |

(52) U.S. Cl.
CPC ........ *H04L 61/1511* (2013.01); *H04L 12/5692* (2013.01); *H04L 29/12066* (2013.01); *H04L 29/12113* (2013.01); *H04L 61/1541* (2013.01); *H04L 65/1069* (2013.01); *H04L 69/169* (2013.01); *H04W 80/10* (2013.01); *H04L 29/12226* (2013.01); *H04L 61/2015* (2013.01)

(58) Field of Classification Search
None
See application file for complete search history.

(56) References Cited

U.S. PATENT DOCUMENTS

| | | | |
|---|---|---|---|
| 5,761,618 A | 6/1998 | Lynch et al. | |
| 6,118,768 A | 9/2000 | Bhatia et al. | |
| 6,512,756 B1 * | 1/2003 | Mustajarvi et al. | 370/341 |
| 6,636,502 B1 * | 10/2003 | Lager et al. | 370/352 |
| 6,651,105 B1 * | 11/2003 | Bhagwat et al. | 709/239 |
| 6,661,782 B1 * | 12/2003 | Mustajarvi et al. | 370/331 |

(Continued)

FOREIGN PATENT DOCUMENTS

WO WO 00/70901 11/2000

OTHER PUBLICATIONS

Mustajarvi, Routing area updating in Packet Radio Network, Jul. 23, 1998, WO 98/32304, pp. 1-31.*

(Continued)

*Primary Examiner* — Brandon Renner
(74) *Attorney, Agent, or Firm* — Harrington & Smith

(57) ABSTRACT

The invention relates to a communication system and method wherein a user equipment contains, or is provided with, a list of items of service-related information. The list of service-related information represents a list of service provider names, services and/or service types or the like. When intending to establish or modify a session or connection or use a service, the user equipment selects, in one of the embodiments, an item from the list and performs a DNS query to resolve the name of the selected item to an IP address which then is used for set-up. The list may be provided by an DHCP server or in a PDP context message. The list may comprise one or more service provider default names, in particular for visited and home networks.

17 Claims, 5 Drawing Sheets

(56) References Cited

U.S. PATENT DOCUMENTS

| | | | |
|---|---|---|---|
| 6,909,719 B1* | 6/2005 | Petersson et al. | 370/395.21 |
| 7,039,688 B2* | 5/2006 | Matsuda et al. | 709/220 |
| 7,099,338 B1* | 8/2006 | Lee | 370/401 |
| 7,130,629 B1* | 10/2006 | Leung et al. | 455/435.1 |
| 7,184,418 B1* | 2/2007 | Baba et al. | 370/331 |
| 7,266,371 B1* | 9/2007 | Amin et al. | 455/419 |
| 7,454,500 B1* | 11/2008 | Hsu et al. | 709/226 |
| 2001/0043577 A1 | 11/2001 | Barany et al. | |
| 2003/0040280 A1 | 2/2003 | Koskelainen | |
| 2006/0239267 A1 | 10/2006 | Ryu | |
| 2007/0124472 A1 | 5/2007 | Requena | |

OTHER PUBLICATIONS

3G TS 22.228 V1.0.0 3$^{rd}$ Generation Partnership Project, Technical Specification Group Services and System Aspects, "Service Requirements for the IP Multimedia Core Network Subsystem (Stage 1)," Sep. 2000, 12 pages.

3G TR 23.821 V1.0.1 3$^{rd}$ Generation Partnership Project, Technical Specification Group Services and System Aspects, "Architecture Principles for Release 2000," Jul. 2000, pp. 1-62.

3G TS 23.228 V1.4.0 3$^{rd}$ Generation Partnership Project, Technical Specification Group Services and System Aspects, "IP Multimedia (IM) Subsystem-Stage 2," Nov. 2000, pp. 1-102.

Nair, G., et al., "DHCP Option for SIP Servers," Internet Draft, Apr. 6, 2000, pp. 1-5.

Alexander, S., et al., "DHCP Options and BOOTP Vendor Extensions," Request for Comments: 2132, Mar. 1997, pp. 1-33.

Droms, R., "Dynamic Host Configuration Protocol," Request for Comments: 2131, Mar. 1997, pp. 1-43.

* cited by examiner

COMMUNICATION SYSTEM AND METHOD FOR ESTABLISHING A CONNECTION TO A SERVING NETWORK ELEMENT

CROSS REFERENCE TO RELATED APPLICATIONS

This application is a divisional of U.S. application Ser. No. 10/433,502, filed Oct. 10, 2003, which was a national stage filing under 35 U.S.C. §371 of International Application No. PCT/EP00/12171, filed on Dec. 4, 2000. These applications are hereby incorporated by reference and relied upon in their entirety.

FIELD AND BACKGROUND OF THE INVENTION

The invention relates to a communication system and method, and in particular to a system and method allowing a user equipment such as a terminal, mobile station (MS) or the like, to get connected to a network element such as an originating or terminating network element or a network element providing a registration function, e.g. for SIP (Session Initiation Protocol). Before a user equipment, e.g. a terminal, can request a registration to a serving network element such as CSCF (Call State Control Function), e.g. for getting connected to another network element, it has to find such a serving network element.

The terminal may be adapted to search, when intending to register, for a proxy network element that helps to find CSCF. For achieving this function, it might be considered to add a new network element providing e.g. a Location Service. However, such a new network element increases the network complexity and overhead.

SUMMARY OF THE INVENTION

The invention provides a system as defined in the independent system claim or any of the dependent system claims.

Further, the invention provides a method as defined in the independent method claim or any of the dependent method claims.

The invention proposes a method and structure enabling a terminal to quickly and easily find a serving network element such as an initial proxy or CSCF.

A communication system according to one of the preferred embodiments of the invention preferably comprises at least one user equipment which is adapted to communicate with a resource designation means to obtain information about session establishment means available in the communication system, wherein the user equipment, when intending to establish a session using one of said session establishment means, includes or is adapted to access a list of items comprising service-related information and to select an item from the list. The selected item is used to enquire the resource designation means to obtain a reference to at least one session establishment means. The user equipment establishes a session via one of the session establishment means to which said reference has been obtained.

The session establishment means may be a proxy device. The resource designation means can be DNS (with proxy being the resource, there can be several resources for the same name e.g. selected according to a round-robin designation). The reference to session establishment means may be the address of the proxy. A session can be a call or video call or other real-time stream type of communication.

It should be appreciated that the term "user equipment" used in the present application documents, can comprise, for instance, the mobile equipment (ME), a smart-card inserted to the mobile equipment (SIM, USIM) and a computer (TE, Terminal Equipment) functionally connected to the mobile equipment and/or the smart-card. Therefore, when specifying that some information is stored by the user equipment, the information can be stored, in fact, in any of these components or distributed among them. Likewise, if user equipment is performing some functions, these functions can be performed in any of these above mentioned components (ME, SIM or TE).

According to another preferred embodiment of the invention, a communication method and system are provided which comprise at least one user equipment which is adapted to establish a connection to a serving network element for connection to another network element, wherein the user equipment, when intending to establish or modify a connection to the serving or another network element, or a further network element includes, or is adapted to access, a list of service-related information and to select an item from the list, the selected item being used by the user equipment to establish or modify the connection to the serving or the another network element.

A subscriber can choose e.g. a proxy from a service-related list (list of items comprising service-related information) such as a list of service providers, or (s)he can use a default service provider. The list may e.g. be stored in the terminal and/or USIM (UMTS Subscriber Identity Module) and/or (prepaid) telephone card.

If proxies are not used, this same structure and method can be utilized to find a supporting network element, e.g. a CSCF, where to register.

The invention provides several advantages such as:

No specialized network element, i.e. Service Location Server, is needed.

According to one of the preferred implementations of the invention, only standard DNS (Domain Name System) in the access network is necessary.

Subscriber may choose whichever service provider, service, service type or alike (s)he wants of the list, even when roaming. That is, the subscriber can utilize e.g. only the access network when roaming in a foreign country, and use her/his own service provider for other services e.g. to save costs.

Subscribers can easily update the service-related list, e.g. the list of service providers, services, service types or alike. The terminal(s) are preferably adapted to offer that service. The updated list can be saved e.g. in a memory means of the terminal or USIM.

Use of a telephone card or card of any other type such as a credit card makes it easy to implement e.g. prepaid service using such selection from the service-related list.

When the terminal is informed on whether it is attached to its home network or roaming outside the home network, it may be adapted to choose a proxy server "home_proxy" of its home network or a proxy server "visited_proxy" of the visited network respectively as default.

The service-related list may be stored e.g. in the memory of terminals and/or USIMs so that the terminals are able to select a service, service provider or the like before registering or even attaching to a network.

An access operator may restrict the subscribers to use only its own services by offering only the default to choose in the service-related list of service providers, services, service types or alike.

Default behaviour preferably is standardized. That is, the access operator may e.g. always offer "visited_proxy" address resolving by DNS (Domain Name System) as well as "home_proxy" address resolving if the operator has own IPT (Internet Protocol Telephony) subscribers.

Home and roaming subscribers can be handled in separate network elements if desired.

A subscriber may choose whether (s)he uses the list on the USIM/terminal's memory and/or the list offered e.g. by DHCP server, PDP context, DNS server, some network service or alike.

The invention enables a service provider selection by an end user.

Further, the invention allows to hide the internal structure of the network, e.g. by making available only a few serving elements such as CSCFs for roamers.

Part of the intelligence to find the proxy is preferably provided in or for the terminal (which may have a function to learn whether it is registered in the home or visited network).

On the network side, in accordance with one of the preferred implementations of the invention, only two addresses have to be added to DNS database. In this case, no additional network hardware or software is normally needed because the access network usually already comprises DNS. In the terminal some additional software may be provided for storing and handling the list of service-related information such as service providers, and for being able to sort the IP addresses.

In other preferred implementations of the invention, methods and systems for finding an initial proxy especially in DHCP (Dynamic Host Configuration Protocol) and PDP (Packet Data Protocol) Context environment are provided. A subscriber can e.g. choose a proxy from a list of service providers, services, service types or alike delivered from one or more DHCP servers and/or in the PDP context and/or from one or more DNS server(s) and/or from one or more separate database(s) and/or from one or more network service(s) and/or alike. The list preferably includes default service providers: "home_proxy" for home subscribers and "visited_proxy" for roaming subscribers, to be used unless expressly selecting another service provider.

Further, the invention allows to make available only a few serving elements such as CSCFs for roamers. Initial proxies in the visited network may recognize locally handled calls of roaming equipments, needing no registration time transfer of call control to the visited network, just to provide local services.

In addition, different initial proxies can be used for the roaming subscribers and home subscribers. Such a technique allows to provide different types of functionality. For instance, home subscribers can be provided with proxies providing certain services, and roaming, i.e. visiting terminals can be connected to proxies that have functionality relating to the routing of calls to local service numbers. This enables proxy functionality separation. Hence, different initial proxies can be selected depending on the user "roaming status" (being in its home network or in a visited network) and different functionalities can be provided in initial proxies.

The invention furthermore allows to overcome problems related to DHCP+DNS usage by introducing a new DHCP parameter to specify whether the subscriber requesting the registration is a roaming or home network subscriber.

DETAILED DESCRIPTION OF PREFERRED EMBODIMENTS OF THE INVENTION

Generally, in accordance with one of preferred aspects of the invention, an implementation thereof relates to the registration to an All-IP network or IM CN SS (IP Multimedia Core Network Subsystem) or IM SS (IP Multimedia Subsystem), and the selection of SIP (Session Initiation Protocol) proxies. The basic idea of this aspect is to logically separate the access level, e.g. the GPRS access "plane", and the SIP plane, and to enable a user to select the initial proxy. As an example, in a terminal memory means such as a SIM-card, a service-related list such as a list of possible service providers is configured. The service providers have associated with them a FQDN (Fully Qualified Domain Name). In addition to the service provider domain names, the list contains two defaults: home_proxy and visited_proxy.

The service provider FQDNs are used as normal domain names to find the initial proxy. The initial proxy may have to verify the appropriateness of its use taking account of the users current serving network.

The default logical names (i.e. home_proxy and visited_proxy) may be resolved in the local DNS to obtain a list of possible proxies. A sorted list is preferably provided in a round-robin fashion from the local DNS. The terminal may apply DNS sortlist directive to sort the addresses according to proximity.

Similarly, a desired service provider can be indicated by the terminal such as MS (Mobile Station) in the DHCP discovery.

The structure and architecture of the network(s) implementing the invention and network elements may e.g. be in accordance with: "Architecure Principles for Release 2000" (3G TR 23.821 issued by ETSI), and "IP Multimedia (IM) Subsystem-Stage 2" (3G TS 23.228).

Preferably, DNS at the access network is used to resolve the FQDNs (Fully Qualified Domain Name) to IP addresses.

Figure 1:
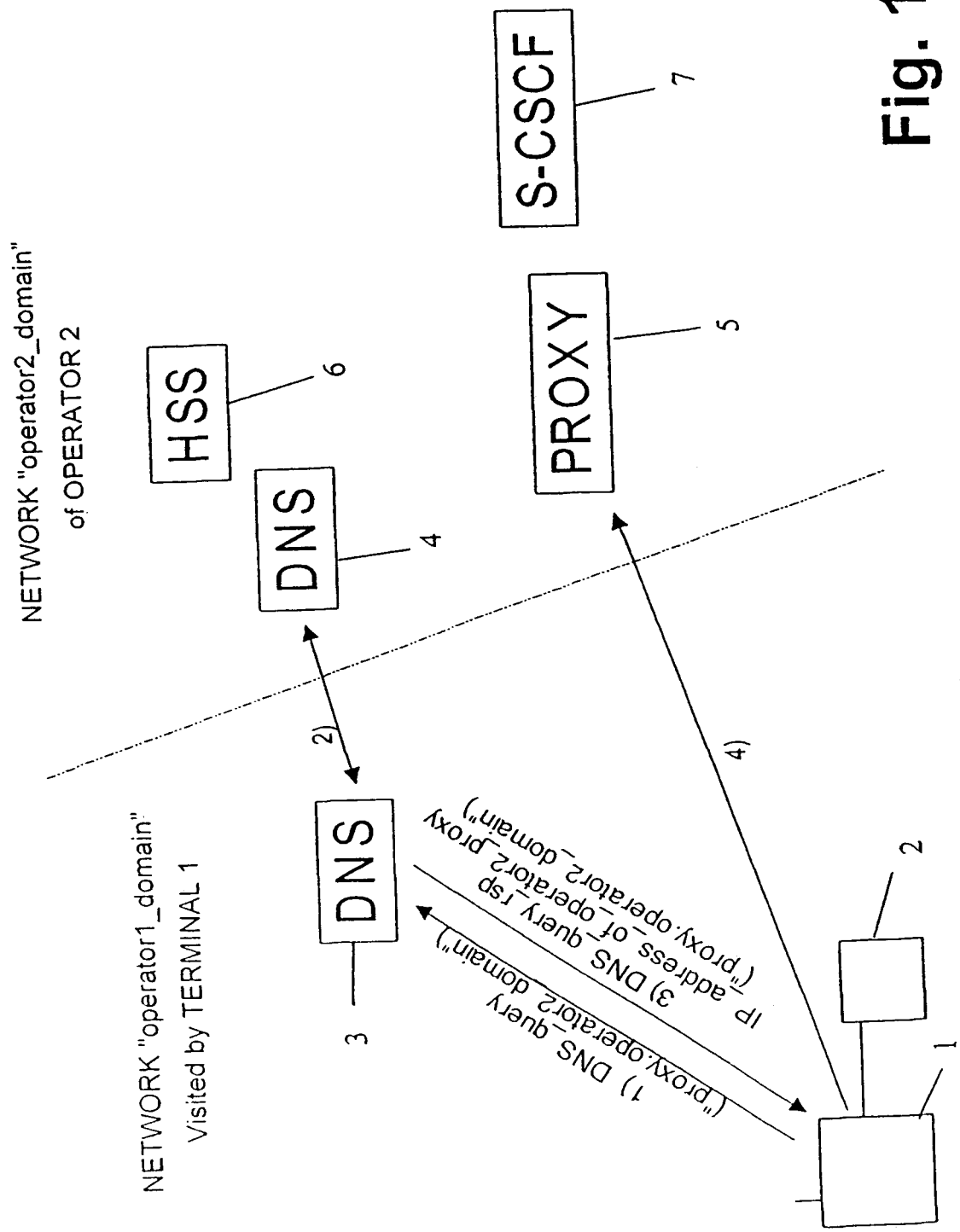
FIG. 1 shows an embodiment of the invention and illustrates a situation in which a service provider or proxy is explicitly selected by a terminal.

FIG. 1 illustrates a first embodiment of the invention in which a terminal (user equipment) 1 has roamed to a (visited) network "operator1_domain" different from its home network. Terminal 1 is utilizing e.g. only GPRS network as visited network "operator1_domain", and wants to use the service of a service provider such as service operator "Operator2" arranged in another network "operator2_domain" different from the visited network, e.g. in the home network of terminal 1. In FIG. 1, the broken inclined line symbolises the boarder line between the visited network (to the left of the boarder line) and the network of operator2 (to the right of the broken line).

For enabling a selection of the service operator "Operator2", the terminal 1 includes, or is provided with, a list of service-related information (service-related list) in which several service providers and/or other types of service indications are listed. This list is displayed e.g. on a display of the terminal 1. The user (subscriber) of the terminal 1 selects the desired service operator "Operator2" from the displayed list of service operators whereupon the necessary steps for establishing a connection to the selected service provider are performed. This will be described below in more detail.

The above mentioned case where the terminal 1 is provided with a service-related list may correspond to a case where the list may be received from outside of the terminal e.g. from DHCP or PDP context. This case may also apply to the below described embodiments shown in FIGS. 2 and 3. Preferably, with the embodiments shown in FIGS. 1 to 3, the service-related list is stored in the USIM/terminal's memory. FIG. 4 relates to a more general embodiment where the service-related list is received from outside the terminal. In this case the list may be a list containing several items, or only the default addresses (home_proxy and visited_proxy), or only one of the default addresses according to the status of the subscriber.

The terminal 1 (or equivalently a USIM, UMTS subscriber identity module) is provided with, or has access to, a memory means 2 which may be an internal memory or a SIM (Subscriber Identity Module) card insertable into the terminal 1, or any other insertable memory card, module, equipment or a telephone card or alike. The memory means 2 includes the service-related list of service-related information such as a list of service providers, services, service types or the like. The list may contain fully qualified domain names (FQDN) of the service providers, services, service types and the like.

The subscriber chooses one of the items in the list, which, in the embodiment of FIG. 1, is "operator2". The "operator 2" is arranged in a network different from the visited network "operator1_domain" visited by terminal 1. The name attached to the selected "operator2" in the list is e.g. the FQDN name "proxy.operator2_domain". Following the selection of the desired service provider, the terminal 1 is adapted, in the embodiment shown in FIG. 1, to perform a DNS query. For this, a message 1) is sent to a DNS server 3 which message "DNS_query" indicates the FQDN name assigned, in the list, to the selected item such as "operator2".

This DNS query of DNS server 3 is performed to learn the IP address of the corresponding proxy which, in the embodiment of FIG. 1, is proxy 5 arranged in the network of operator 2. The DNS server 3 normally does not store the IP address of the proxy 5 arranged in a different network, and therefore accesses DNS server 4 provided for the network of operator 2. The DNS server 3 sends the name "proxy.operator2_domain" received from terminal 1 to the DNS server 4 which resolves this name to the associated IP address of proxy server 5. The DNS server 4 returns the IP address of proxy 5 to DNS server 3. This information flow between DNS servers 3 and 4 is represented by the double-headed arrow numbered 2).

In a next step, the DNS server 3 transmits a response (message 3) to the terminal 1 indicating the IP address of the proxy 5 of operator 2 (DNS_query_rspIP_address_of operator2_proxy("proxy.operator2_domain")). The terminal 1 is therefore informed on the appropriate IP address and addresses proxy 5 by sending a connection or set-up request 4) to the proxy 5 using the IP address thereof. The proxy 5 performs the necessary known steps for providing the services of operator 2 to the terminal 1 by e.g. informing a serving network element such as Serving Call State Control Function (S-CSCF) 7 to take charge of calls or connections to or from terminal 1. The necessary information may be stored in HSS (Home Subscriber Server) 6.

In a case where the DNS server 3 knows the IP address of the service provider, service, service type or the like selected from the list by the terminal 1 and indicated in message 1), it may immediately return this IP address to the terminal 1, without necessity of performing the message exchange 2) with the DNS server 4 or any other component.

Briefly stated, in the embodiment of FIG. 1, the terminal 1 (or USIM) includes or has access to a FQDN list of service providers. The subscriber chooses a service provider from the list. A DNS query is performed to learn the IP address of the corresponding proxy. A Registration (or Setup) request is then sent to that IP address.

Figure 5:
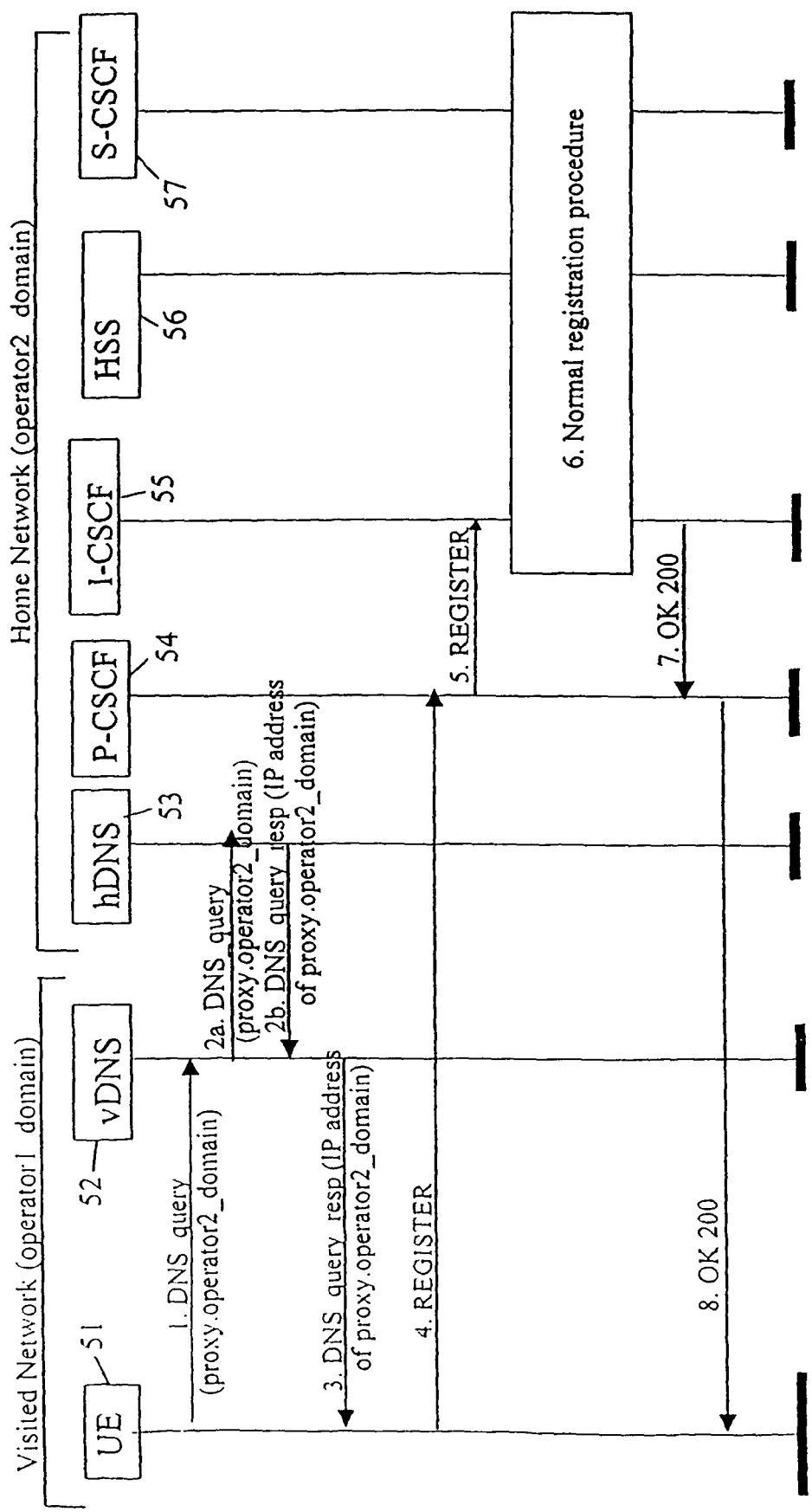

The below described FIG. 5 illustrates an example of a general level information flow related to such a registration.

If the subscriber does not want to choose a service provider, service, service type or alike from the displayed list, e.g. the service provider list, a default is preferably used. Subscriber can also explicitly choose the default. Preferably, there are two defaults: "home_proxy" (for selection of proxy server of the home network) is used in the subscriber's home network while "visited_proxy" (for selection of proxy server of the visited network) is used in all other networks. The terminal and/or the network decides which one to use.

The "home_proxy" entry specifies the list of proxies available for the home subscribers. The "visited_proxy" entry specifies the list of proxies available for the roaming subscribers. The lists do not have to be equal. This way roamers can be centralized into one or two or a few proxies.

DNS server 3 resolves "home_proxy" and "visited_proxy" as local names i.e. it appends the domain name. The access operator must have "home_proxy" and "visited_proxy" entries in the domain.

Because the access operator administrates DNS, it can conduct the default queries (i.e. home_proxy and visited_proxy) to its own proxy/proxies or to proxies of specialized service operator(s) if the access operator offers only access service (e.g. GPRS network). The load can be shared also among several operators by "round robin" method in DNS. By the same method load can be shared among proxies.

One reason for enquiring the DNS using the default name, lies in the possibility to provide different proxies for different types of subscribers. This is especially true in the case where "visited_proxy" entry specifies the list of proxies available for the roaming subscribers. There could be different proxies in the visited network for the roamers from different networks and different proxies for the subscribers of the same network i.e. own subscribers. For instance, Sonera network in Finland could provide a set of proxies (proxy1, . . . , proxyN) for roaming subscribers from any other network and a set of proxies (proxyN+1, . . ., proxyK) for its own subscribers, where N<K.

By having different proxies for own subscribers and roamers enables different types of proxies to be provided for these categories of subscribers. For instance, for roamers there could be provided special proxies which have functionality relating to the routing of calls to local numbers within the country or countries in the area of which the network is operating. To the contrary, for own subscribers could be provided proxies that straightforwardly set-up the session towards actual serving CSCFs that perform the call routing towards the said local numbers. The rationale for the routing of sessions to actual serving CSCFs could lie, for instance, in the fact that certain services are provided for own subscribers from these CSCFs. Examples of these services are prepaid charging, call screening and various other call setup related facilities.

In a different case certain proxies are dedicated for own subscribers because these proxies contain some initial service processing for services provided for own subscribers.

For instance, the initial proxies for own subscribers could include SIP call processing language scripts that have been downloaded therein. These scripts are executed to provide some service features associated with the sessions set-up through these proxies. Similarly, any other kind of service execution environments can be envisioned to the initial proxies for own subscribers. Therefore, the initial proxies for own subscribers could include means for executing these scripts. The scripts are triggered in the initial proxies based on session set-up information, which is carried, for instance, in the SIP INVITE message. Examples of services provided using these call processing language scripts include call re-routing, call screening and various other call set-up related facilities. In this kind of a solution only those services that can be executed for the sessions in the proxies are executed there, whereas the rest of the services are executed using means associated with the serving CSCFs within the home network to which the sessions are set-up from the initial proxies.

Figure 2:
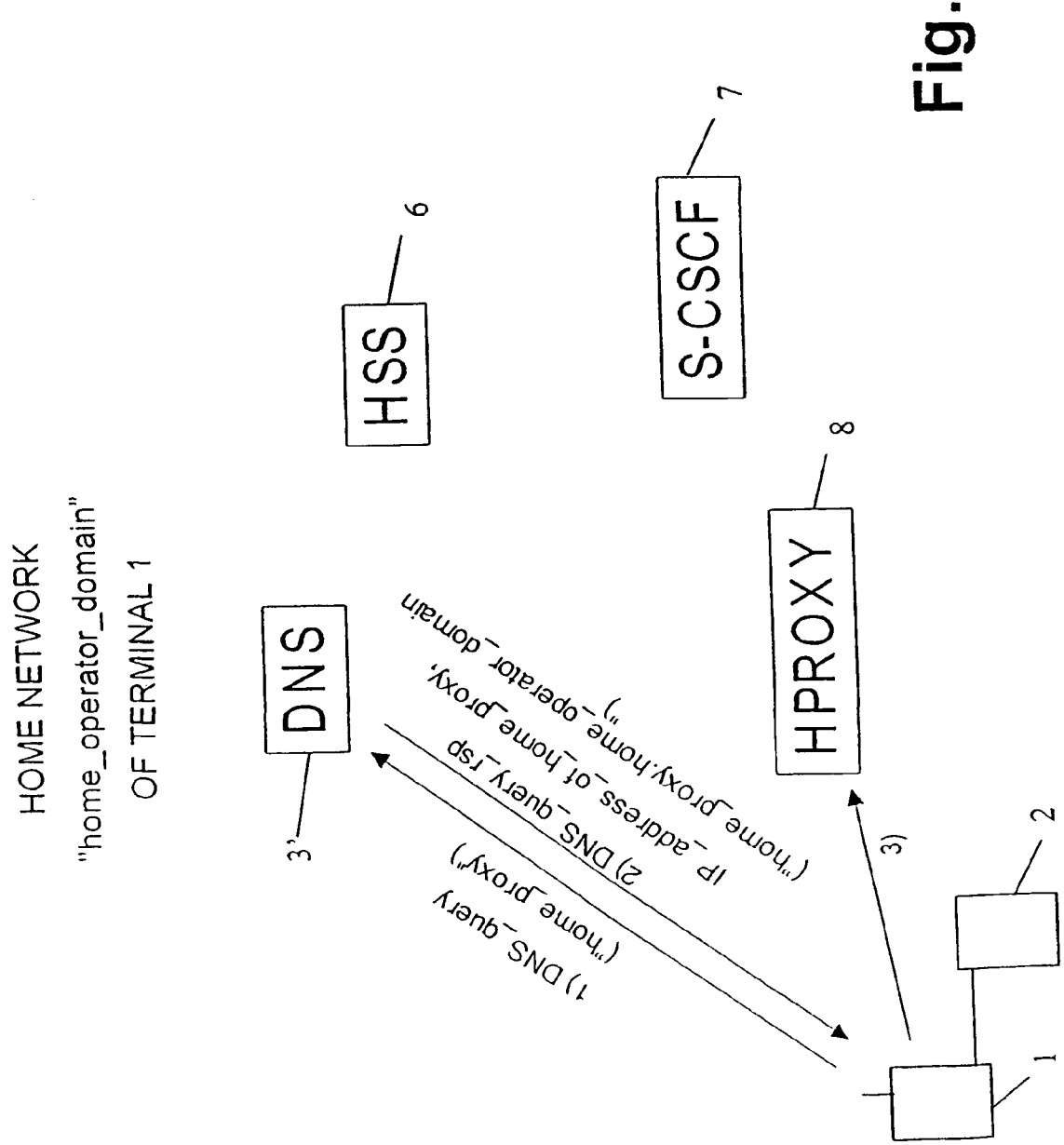
FIG. 2 illustrates a method and structure of an embodiment for performing a default selection when the terminal is attached to its home network.
Figure 3:
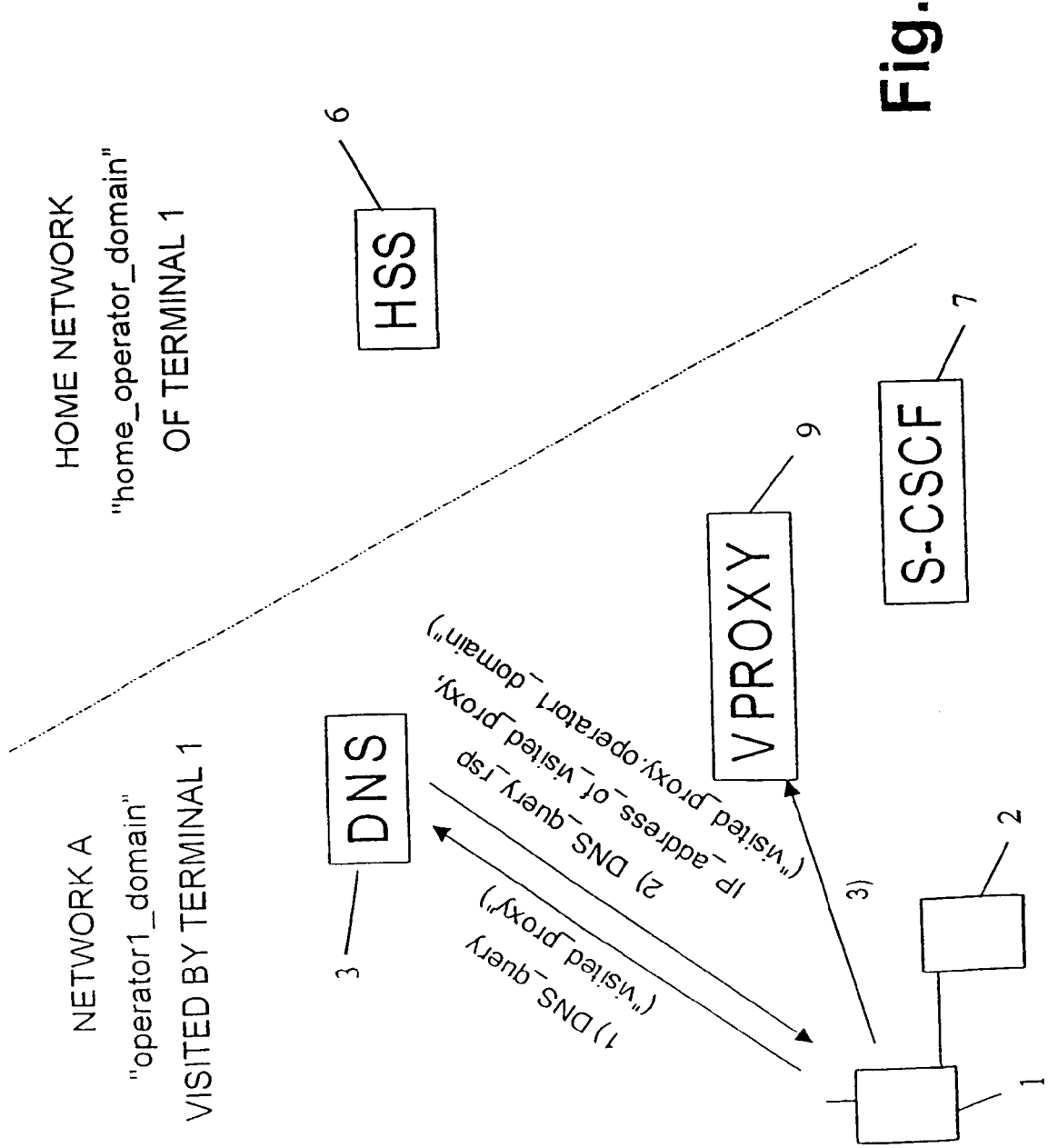
FIG. 3 shows a method and structure of an embodiment for performing a default selection when the terminal is roaming, i.e. attached or attaching to a visited network.
Figure 4:
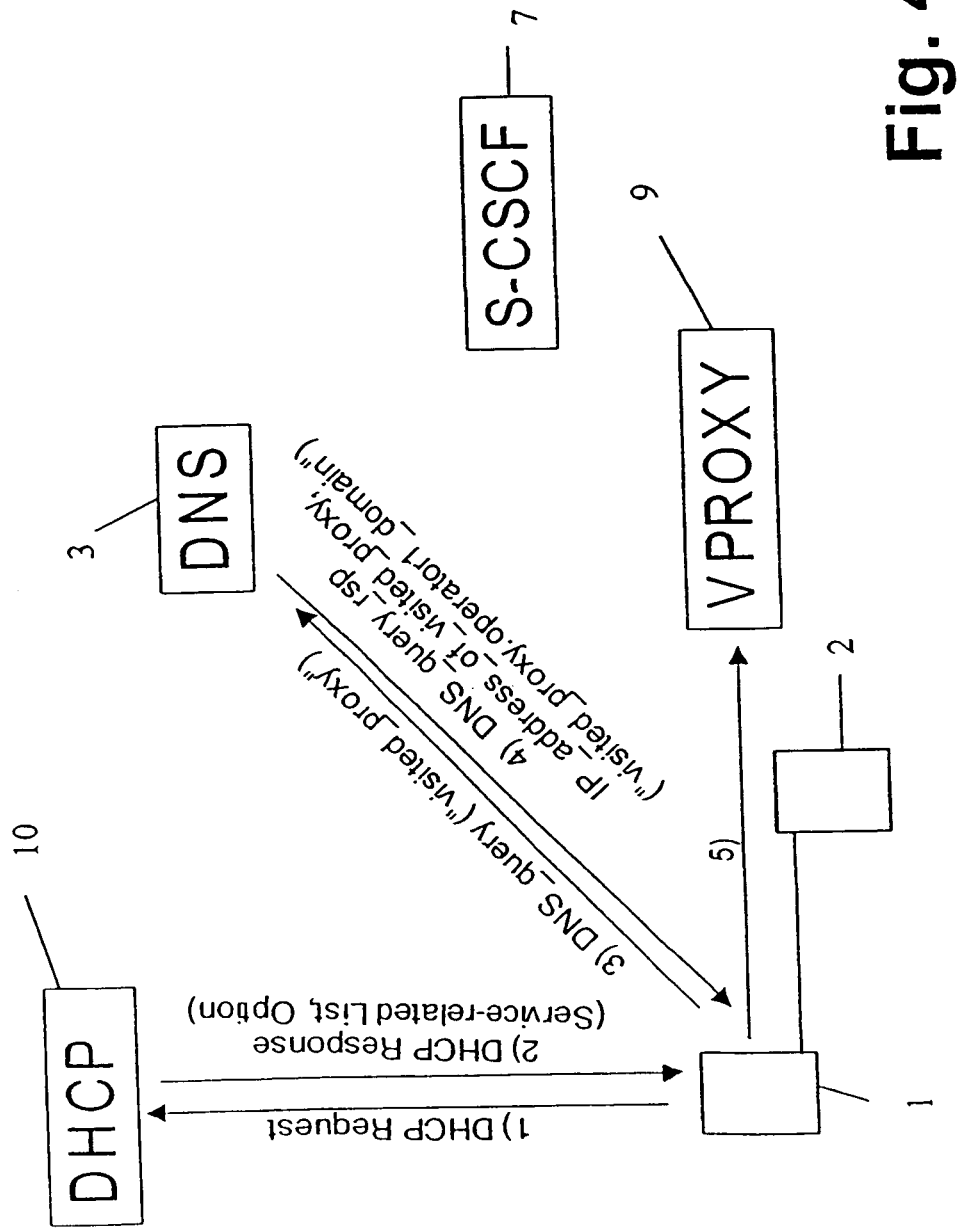
FIG. 4 shows a method and structure of an embodiment based on DHCP for performing a selection of a service provider, service, or the like, and FIG. 5 illustrates a registration example primarily but not exclusively related to the embodiment shown in FIG. 1.

FIGS. 2 and 3 show embodiments for performing a default selection. The explanations with regard to the first embodiment shown in FIG. 1 likewise apply to the embodiments shown in FIGS. 2 and 3 as regards structure and functioning thereof.

FIG. 2 discloses an embodiment which may be structured in a similar manner as the above-described first embodiment shown in FIG. 1. The elements shown in FIG. 2 are in this embodiment all part of the home network "home_operator_domain" of terminal 1. A proxy server 8 is the home proxy, i.e. a proxy server of the home_network. When the terminal 1 wants to receive a service or get connected to a service provider, the service-related list of service providers or the like is retrieved from the memory 2, or provided to the terminal by another entity. When the user of terminal 1 does not perform any selection from the list, an item set as default value, e.g. default service provider, is selected. This default item is also selected when the user expressly selects this default item.

The terminal 1 is adapted to send, as message (1), a query message to DNS server 3' (DNS_Query), indicating the default name "home_proxy". The DNS server 3' may correspond to DNS server 3 or 4 shown in FIG. 1.

The DNS server 3' retrieves the IP address of home proxy 8 from its data base, and returns, as message 2), this IP address to the terminal 1. In a next step, the terminal 1 sends a registration (or set-up) message to home proxy 8 using its IP address indicated in the response 2) of DNS 3'. The home proxy 8 then performs a registration (or connection set-up) in the known manner, with S-CSCF 7 being in charge of connection control for connections to and from terminal 1.

FIG. 3 shows a structure and functioning of an embodiment of the invention relating to a default selection when roaming, i.e. when the terminal 1 is attached to a network A "operator 1_domain" visited by terminal 1. In FIG. 3, the part left of the broken line represents the components of the visited network A whereas the part to the right of the broken line represents the home network "home_operator_domain" of terminal 1.

The serving CSCF (S-CSCF) 7 shown in FIG. 3 can either be located in the visited network A as shown in FIG. 3, or maybe located in the home network of terminal 1.

When the terminal 1 wants to get connected but does not select any item from the service-related list stored in memory means 2 and displayed on the display of terminal 1 for selection purpose, or when the displayed default proxy of the visited network is expressly selected, the terminal 1 is adapted to send a DNS query to the domain name server DNS 3, indicating the logical name, i.e. the visited_proxy. The DNS server 3 resolves this logical name to the associated IP address of the proxy server 9 of the visited network (VPROXY) and returns, as response to the query message 1), the response message 2) as indicated in FIG. 3. In step 3), the terminal 1 accesses the proxy server 9 of the visited network A using the IP address thereof as returned from DNS server 3. Thereafter, the customary steps for serving the terminal 1, e.g. by the serving CSCF 7, are performed, accessing, if necessary, HSS 6 of the home network of terminal 1.

In all or some of the embodiments discloses above and in the following such as the one shown in FIG. 4, the terminal 1 or the software of terminal 1 may offer a similar service as the sortlist directive of DNS 3, 4 resolver, in order to use always the nearest proxy.

Preferably only names of service operators and one or two defaults, e.g. "Default, Sonera, Radiolinja, . . . " are displayed on the terminal 1 so that the subscriber can watch and select from these names. The subscriber therefore does not see the FQDNs assigned to the displayed names. The subscriber can preferably also configure the terminal 1 to show or not to show the list of service-related information such as service operators. If the list is not shown, default may be automatically selected and used.

In the following, additional methods for finding an initial proxy especially in DHCP (Dynamic Host Configuration Protocol) and/or PDP (Packet Data Protocol) Context environment are described. This is an enhancement to the above described embodiments relying on DNS resolving.

The below described methods are preferably employed when DHCP and/or PDP context is used to find the initial proxy.

The list of service-related information such as a list of service providers, services, service types or alike is in this case preferably delivered from one or more DHCP servers and/or in the PDP context and/or from one or more DNS server(s) and/or from one or more separate database(s) and/or from one or more network service(s) and/or alike.

A subscriber can choose a proxy from this list sent to the terminal and displayed thereon. The list preferably additionally includes information on service providers to be used as default providers: "home_proxy" for home subscribers and "visited proxy" for roaming subscribers.

The terminal can be a low-end model that uses automatically the default ("home_proxy" in the home network and "visited_proxy" in the visited network).

DNS at the access network is used to resolve the FQDNs (Fully Qualified Domain Name) to IP addresses.

Similar to the above described embodiments, the terminal 1 (or USIM) stores or receives a FQDN list of service providers, services, service types or alike. Subscriber chooses one of the items in the list. DNS query is done to get the IP address of the corresponding proxy. The terminal sends the registration (or set-up) request to that IP address. The above explanations with regard to default selection apply to these embodiments as well.

Because the access operator administrates DHCP and PDP context, it can conduct the default queries (i.e. "home_proxy" and "visited_proxy") to its own proxies or to the proxies of the specialized service operator(s) if the access operator e.g. offers only access service (e.g. GPRS network). The load can be shared also among several operators by "round robin" method in DNS. By the same method load is preferably shared among proxies.

The software of the terminal may offer a similar service as the sortlist directive of DNS resolver, in order to use always the nearest proxy. Terminal 1 may get the configuration directives for the DNS resolver from the same or different source from where it gets the list of service providers, services, service types or alike.

The terminal may get the whole list, a part of the list or one or more separate item(s) of the list automatically, or may actively ask for the whole list, a part of the list or one or more separate item(s) of the list. Separate item(s), a part of the list or the whole list are saved as one or more options in the DHCP server, as RRs (Resource Records) in DNS server, as records in separate database(s), as appropriate entities in some network service(s) or alike from where they are delivered to the terminal in DHCP message(s), in PDP context, as DNS response(s), as responses to database query(ies), as service response(s) or alike.

There shall be a certain redundancy because of the security and service level. In the list of service providers there may be two (or more) "home_proxy" and/or "visited_proxy" items; and/or these items may contain two (or more) addresses; and/or DNS server may offer two (or more) IP addresses for each address.

In the terminal some extra software is preferably provided to handle the list of service providers, services, service types or alike and to be able to sort the IP addresses.

In the following, a DHCP implementation of an embodiment of the invention is described. On the network side DHCP and DNS servers are needed in such a DHCP implementation.

In the embodiment shown in FIG. 4, one (or more) DHCP server 10 is provided. When the terminal 1 intends to get active, e.g. establish a connection to a serving network element such as S-CSCF 7, it sends, as first step 1), a DHCP request to the DHCP server 10. This request of step 1) may e.g. a DHCPDISCOVER packet, in response to which the DHCP server 10 may return DHCPOFFER packet containing a proposed IP address for the terminal 1, the name of the server 10 and its IP address. If accepted by terminal 1, a DHCPREQUEST may be returned, as part of message exchange step 1), to the server 10. As response 2) thereto, the server 10 may send a DHCPACK response to the terminal 1. This response 2) contains a service-related list such as a list of service providers, services, service types and/or the like.

After having received the list, the terminal 1 performs a selection from this list according to subscriber's selection or corresponding to a default selection in case no other item of the list is designated. Thereafter, the terminal 1 addresses DNS server 3 indicating the selected item such as "visited_proxy", as represented by message 3) of FIG. 4. DNS server 3 returns a response indicating the IP address aside to the visited proxy 9, as represented by response 4). Thereafter, the terminal 1 sends a registration (or set-up) request 5) to the visited proxy 9 for registration into e.g. a Serving-CSCF 7, i.e. for establishing a connection and being served e.g. by S-CSCF 7.

The steps 3) to 5) of FIG. 4 are essentially identical to the steps 1) to 3) of FIG. 3 (or FIGS. 1, 2, apart from the different selected items or proxies).

In the embodiment shown in FIG. 4, "DHCP Option for SIP Servers" (Internet Draft draft-ietf-sip-dhcp-01.txt) may e.g. be used to implement the list as DHCP option(s). If the definitions of this draft are not used, RFC2132 "DHCP Options and BOOTP Vendor Extensions" and RFC2131 "Dynamic Host Configuration Protocol" can be used. Needed items may be stored into one single option, or into a group of options of the same type, or into a group of different types of options.

Others than low-end terminals may be provided with enough intelligence to request the correct option(s) and/or divide the received options into "suboptions" and decode the concatenated option lists if needed.

A new type of option may also be defined to store item(s). For low-end terminals it may be enough if they can handle the default i.e. "home_proxy" and "visited_proxy".

There are many ways how an option (a new or an old one) may be formulated. Besides the normal administrative fields (e.g. the code):

a) The option may include two internal fields: the address class and the address.

b) The option may include one address class field and several address fields that contain addresses of that class.

c) The option may include a list of "address class-address" pairs.

d) The option may include only an address or several addresses if the addresses belong to the same class and the option has an unambiguous code.

e) Besides the address class and the address fields there may be also other fields, e.g. name field, in the above alternatives a) to c).

The address class indicates whether the option includes an address of service provider, service, service type or alike. The address is an address preferably of the type specified with the address class. The address is an address of an initial proxy. Fields are separated by character(s) not valid in the fields themselves.

Fields may be fixed length or variable length fields. The length may be optional if the length can be known otherwise e.g. when there are only two fixed length fields. Each address class, or some address classes together, may have an own option type i.e. an own unambiguous code.

EXAMPLES

The home_proxy option may be the following:
"CODE LENGTH home_proxy:cscf4.im.sonera.fi"
and the visited_proxy option:
"CODE LENGTH visited_proxy:cscf9.im.sonera.fi"
An option that gives a list of service providers may be:
"CODE LENGTH service_provider:im.sonera.fi,im.radi-olinja.fi,im.teli-a.fi".
An option that gives a list of services may look like:
"CODE LENGTH movies:video.movies.com,video.worldmovies.com;weather:weather.sonera.f i;sports:video.sports.com,sports.bestmoments.com".

In the following, a PDP context implementation of an embodiment of the invention is explained.

In the PDP context there is preferably provided a separate entry for "home_proxy" and "visited_proxy" and also for other list items mentioned above.

In a very simple solution according to one embodiment of the invention, only one of the entries is returned to the terminal based on the knowledge whether the subscriber is a roaming subscriber or a home subscriber.

In another solution according to a further embodiment of the invention, both "home_proxy" and "visited_proxy" are returned to the terminal 1 that decides alone or maybe with the help of the network which of them to use.

In an implementation using DNS, no additional component is needed because the access network is usually equipped with DNS. In the terminal some additional software is provided to handle the list of service providers, services, service types or alike and to be able to sort the IP addresses. A standard DNS structure is sufficient for a DNS implementation of the invention.

In other implementations, the list of service-related information such as a list of service providers, services, service types or alike may be extracted from database(s) local in each network element or offered by specialized or general service(s) in the network and carried to the terminal by an existing and/or a new protocol.

FIG. 5 illustrates a registration example primarily but not exclusively related to the embodiment shown in FIG. 1, with proxy and serving CSCF provided in the home network (operator2 domain) and user being in the visited network (operator1 domain) and not yet being registered. The following registration steps are performed, referring to the numbering shown in FIG. 5.

1. A user equipment (UE) 51 roaming in a visited network sends a message "DNS_query (proxy.operator2_domain)" to the DNS server (vDNS) 52 of the visited network, asking for the address of proxy.operator2_domain.

2a. The vDNS 52 transmits a message "DNS_query (proxy.operator2_domain)" to the DNS server (hDNS) 53 of the home network of the UE 51.

2b. The DNS server (hDNS) 53 returns a message "DNS_query_resp (IP address of proxy.operator2_domain)" indicating the IP address of proxy.operator2_domain.

3. The DNS server vDNS 52 tranmits this response message "DNS_query_resp (IP address of proxy.operator2_domain)" to the UE 51.

4. As next step, the UE 51 issues a REGISTER Request to the indicated IP address, i.e. to the proxy CSCF (P-CSCF) 54.

5. The proxy CSCF (P-CSCF) 54 transmits a REGISTER request to an I-CSCF (Interrogating Call State Control Function) 55.

6. Thereupon, a normal registration procedure is performed involving a HSS (Home Subscriber Server) 56 and an S-CSCF (Serving Call State Control Function) 57.

7. and 8. After registration, "OK 200" messages of SIP (Session Initiation Protocol) may be sent from I-CSCF 55 to the P-CSCF 54, and from P-CSCF 54 to the UE 51.

The above described embodiments and solutions may be generalized as follows.

For DNS (i.e. Domain Name System) a DNS server is needed. The DNS server does not have to be located in the access network. It can be located in the IM (IP Multimedia) network or in any other network. The terminal has to know the address of a DNS server. The address is preferably stored in the terminal, and/or received from DHCP and/or in the PDP context and/or some other way. The existence of the address of a DNS server means that the domain name service is available for the terminal.

The service-related list may partly be stored in the USIM/terminal's memory, on an insertable memory card, module, equipment, on a telephone card, or alike and partly be received from outside of the terminal from one or more DHCP servers and/or in the PDP context and/or from one or more DNS server(s) and/or from one or more separate database(s) and/or from one or more network service(s) and/or alike.

At least the fourth embodiment shown in FIG. 4, the PDP context implementation and the other implementations can be combined with other embodiments such as shown in FIGS. 1 to 3. The explanations of the previous paragraphs likewise apply to any such combination.

All embodiments may be implemented so as to comply with only a simple case where the service-related list consists only of the "default" i.e. home_proxy and visited_proxy. The terminal deduces by itself and/or with the help of information got from the network and/or with the help of one or more network elements whether it is located in the home or a foreign network and utilizes the home_proxy or visited_proxy address respectively.

The fourth embodiment shown in FIG. 4 may be implemented so as to comply with a very simple case where DHCP returns only one logical name to the terminal. The logical name is home_proxy if the terminal is located in its home network while it is visited proxy if the terminal is located in a foreign network. Home_proxy, and respectively visited_proxy, is a general, well known, preferably standardized logical name that denotes a proxy or a set of proxies reserved for home subscribers, respectively for visited subscribers. The terminal resolves the home_proxy (respectively visited_proxy) logical name with DNS.

Because DNS normally appends or can be configured to append the default domain name to the name in question before resolving it, the logical names (home_proxy and visited_proxy) need not be FQDNs but can be simple logical names. That is why they work in all networks.

In the above described embodiments, GPRS is used as access network. However, GPRS is only an example. The invention can be used with any other access network too. PDP context and PDP context activation are concepts used in the GPRS access network. More generally, PDP context can be regarded as a communication channel between the access network and the network itself, and the service-related list can be seen as a parameter or a set of parameters of that communication channel. When other access network is used, equivalent, equal or similar concepts are used instead, e.g. for providing a communication channel between the access network and the network itself, and the parameter or set of parameters of that communication channel.

The above described SIP is an example of a usable call control protocol. The invention can also be implemented using any other call control protocol.

The exemplary embodiments include a computer program embodied on a non-transitory computer-readable medium, where the computer program is configured to control a processor to perform operations comprising those as described above with respect to FIGS. 1-5.

We claim:

1. A method, comprising:
obtaining in a user equipment information about a proxy available in a communication system;
receiving in the user equipment a list of parameters in response to intending to establish a session using the proxy in the communication system, the list of parameters comprising service-related information;
where the information is obtained from, and the list of parameters is received from, a network element, other than the proxy, of an access network of the communication system;
selecting at least one parameter from the list; and
establishing the session via the proxy using the selected parameter,
wherein said receiving of the list of parameters comprises receiving the list using a communication channel of the access network of the communication system where the session is to be established, wherein the list is received in a packet data protocol context message, and wherein the list is extracted from at least one database of the network element of the access network of the communication system.

2. The method as recited in claim 1, wherein the network element comprises a dynamic host configuration protocol server.

3. The method as recited in claim 1, wherein the communication channel comprises a packet data protocol context channel.

4. An apparatus, comprising:
at least one processor; and
at least one memory including computer program code, where the at least one memory and the computer program code are configured, with the at least one processor, to cause the apparatus to at least:

obtain information about a proxy available in a communication system;

receive a list of parameters, the list comprising service-related information;

where the information is obtained from, and the list of parameters are received from, a network element, other than the proxy, of an access network of the communication system;

select a parameter from the list;

establish a session using the parameter, wherein the computer code is configured with the at least one processor to cause the apparatus to receive the list using a communication channel of the access network of the communication system where the session is to be established, wherein the list is received in a packet data protocol context message, and wherein the list is extracted from at least one database of the network element of the access network of the communication system.

5. The apparatus as recited in claim 4, wherein the network element comprises a dynamic host configuration protocol server.

6. The apparatus as recited in claim 4, wherein the apparatus is a user equipment.

7. The apparatus as recited in claim 4, wherein the communication channel comprises a packet data protocol context channel.

8. The apparatus as recited in claim 4, wherein a packet data protocol context associated with the packet data protocol context message comprises an entry for at least one of a proxy of a home network, a proxy of a visited network, and other list items.

9. The apparatus as recited in claim 4, wherein a packet data protocol context associated with the packet data protocol context message comprises only one entry based on whether a subscriber is a roaming subscriber or a home subscriber.

10. The apparatus as recited in claim 4, wherein a packet data protocol context associated with the packet data protocol context message comprises several entries, and wherein the computer code is configured with the at least one processor to cause the apparatus to decide which of the entries to use.

11. The apparatus as recited in claim 4, wherein the computer code is configured with the at least one processor to cause the apparatus to send, when roaming in a visited network, an address inquiry message to a server of the visited network, to receive a response message indicating an address, and to register using the received address.

12. A computer program embodied on a non-transitory computer-readable medium, the computer program configured to control a processor to perform operations comprising:

obtaining in a user equipment information about a proxy available in a communication system;

receiving in the user equipment a list of parameters in response to intending to establish a session using the proxy in the communication system, the list of parameters comprising service-related information;

where the information is obtained from, and the list of parameters is received from, a network element, other than the proxy, of an access network of the communication system;

selecting at least one parameter from the list; and establishing the session via the proxy using the at least one selected parameter, wherein said receiving of the list of parameters comprises receiving the list using a communication channel of the access network of the communication system where the session is to be established, wherein the list is received in a packet data protocol context message, and wherein the list is extracted from at least one database of the network element of the access network of the communication system.

13. The computer program embodied on the non-transitory computer-readable medium of claim 12, wherein the network element comprises a dynamic host configuration protocol server.

14. A method, comprising:

in response to a need to establish a connection between a user terminal and a network element, sending a request message from the user terminal to a dynamic host configuration protocol server;

receiving from the dynamic host configuration protocol server a service-related list, wherein the list is received in a packet data protocol context message;

selecting a proxy name from the service-related list;

sending the selected proxy name from the user terminal to a domain name server;

receiving from the domain name server an interne protocol address associated with the selected proxy name; and using the interne protocol address, sending a request from the user terminal to the selected proxy to establish the connection with the network element.

15. The method of claim 14, wherein the network element comprises a call state control function.

16. The method of claim 14, wherein the proxy name is one of home_proxy or visited_proxy.

17. The method of claim 14, wherein the service-related list is implemented as at least one dynamic host configuration protocol option.

* * * * *

UNITED STATES PATENT AND TRADEMARK OFFICE
CERTIFICATE OF CORRECTION

| | | |
|---|---|---|
| PATENT NO. | : 9,210,120 B2 | Page 1 of 1 |
| APPLICATION NO. | : 12/073640 | |
| DATED | : December 8, 2015 | |
| INVENTOR(S) | : Westman et al. | |

It is certified that error appears in the above-identified patent and that said Letters Patent is hereby corrected as shown below:

In the claims

Claim 14, col. 14, line 38 "interne" should be deleted and --internet-- should be inserted.

Claim 14, col. 14, line 41 "interne" should be deleted and --internet-- should be inserted.

Signed and Sealed this
Seventeenth Day of May, 2016

Michelle K. Lee
*Director of the United States Patent and Trademark Office*